United States Patent [19]

Usami et al.

[11] Patent Number: 5,075,147
[45] Date of Patent: Dec. 24, 1991

[54] METHOD FOR OPTICALLY RECORDING INFORMATION AND INFORMATION RECORDED MEDIUM

[75] Inventors: Yoshihisa Usami, Shizuoka; Yoshio Inagaki, Kanagawa; Masao Yabe; Mitsuru Sawano, both of Shizuoka, all of Japan

[73] Assignee: Fuji Photo Film Co., Ltd., Kanagawa, Japan

[21] Appl. No.: 497,921

[22] Filed: Mar. 23, 1990

[30] Foreign Application Priority Data

Mar. 24, 1989 [JP] Japan .................................. 1-72481

[51] Int. Cl.$^5$ ................................................ B32B 3/02
[52] U.S. Cl. ........................................ 428/64; 428/65; 428/76; 428/412; 428/457; 428/913; 430/495; 430/945; 346/76 L; 346/135.1; 369/272
[58] Field of Search .............. 430/495, 945; 346/76 L, 346/135.1; 369/272, 284, 286, 288; 428/64, 65, 412, 913, 457, 76

[56] References Cited

U.S. PATENT DOCUMENTS

| | | | |
|---|---|---|---|
| 4,940,618 | 7/1990 | Hamada et al. | 428/65 |
| 4,943,515 | 7/1990 | Okazaki et al. | 430/495 |
| 4,944,967 | 7/1990 | Yabe et al. | 430/495 |
| 4,977,064 | 12/1990 | Sukawa et al. | 430/495 |

Primary Examiner—Patrick J. Ryan
Attorney, Agent, or Firm—Sixbey, Friedman, Leedom & Ferguson

[57] ABSTRACT

A method of optically recording information on an information recording medium comprising a disc-shaped substrate having a pregroove comprising a groove having a depth of 800 to 2,000 angstroms and a half width of 0.2 to 0.7 μm thereon, a recording layer comprising a dye for optically recording information by means of a laser beam which is provided on the substrate, and a reflecting layer of a metal which is provided on the recording layer is disclosed. The recording method is carried out by irradiating a bottom part of the pregroove having the recording layer thereon with a laser beam from the substrate side under rotation of the recording medium. Further, an information recorded medium which is recorded with information by the above method is also disclosed.

20 Claims, 3 Drawing Sheets

METHOD FOR OPTICALLY RECORDING INFORMATION AND INFORMATION RECORDED MEDIUM

BACKGROUND OF THE INVENTION

1. Field of the Invention

The present invention relates to a method for optically recording information on an information recording medium by means of a laser beam having high energy density and an information recorded medium which is recorded with information by the method.

2. Description of Prior Art

Information recording media for recording and/or reproducing information by the use of a laser beam of high energy density have been developed in recent years and are put into practical use. Such recording media have been widely utilized in various fields, for example, as optical discs such as a video disc and an audio disc as well as memory discs for a large-capacity computer and a large-capacity static image file, a microimage recording medium, an ultramicroimage recording medium, a microfacsimile, and an optical memory card. Among these recording media, a compact disc (referred to as CD) is now widely used as an audio disc for reproducing a music or the like. The compact disc is used only for reproducing an information represented by a series of pits which were formed previously on a substrate of the disc by a manufacturer of the compact disc when it was manufactured. In more detail, the compact disc is manufactured by molding an appropriate plastic material to give a substrate having a groove thereon (which is utilized for tracking) and a series of pits on the bottom of the groove and then plating a metal thereon to form a reflecting layer. Thus, the compact disc is a recording medium of a read-only type.

Reading of the information from the compact disc is conducted by irradiating the disc under rotation with a laser beam. The information can be reproduced by detecting change of intensity of reflected light which is caused due to presence or absence of pits on the compact disc. The compact disc for reproduction of information only is generally rotated a at fixed linear rate of 1.2 to 1.4 m/sec. according to the predetermined CD standard to read out (reproduce) the recorded information therefrom, and CD is required to allow long time recording (up to 74 min.) using a signal-recording area within the area between inner diameter of 45 mm and outer diameter of 116 mm and using pit width of 0.8 μm and track pitch of 1.6 μm.

As described hereinbefore, audio compact discs are widely used at the present time. Accordingly, a great number of compact disc players for reproducing music or other information recorded on the compact disc are now supplied on market with low prices and widely used. These compact disc players are manufactured to match with the commonly defined requirements of reproducing system.

An information recording medium of DRAW (Direct Read After Write) type on which information can be recorded after the medium is manufactured has been already known. The information recording medium of DRAW type basically comprises a transparent substrate of plastic or glass material and a recording layer provided on the substrate. As materials of the recording layer, metals such as Bi, Sn, In and Te or semimetals, and dyes such as a cyanine dye, a metal complex compound and a quinone dye are generally employed.

Writing of information on the recording medium can be conducted, for example, by irradiating the medium with a laser beam. Under irradiation with the laser beam, the irradiated area of the recording layer of the recording medium absorbs energy of the beam and rise of temperature locally occurs and, as a result, a chemical or physical change such as formation of pits is caused to alter (or change) optical characteristics of the recording layer in the irradiated area, whereby recording of the information is made. Reading of the information from the recording medium is also conducted by irradiating the medium with a laser beam having a less energy. The information can be reproduced by detecting change of reflected or transmitted light corresponding to the change in optical characteristics of the recording layer.

Irradiation of a laser beam on the recording medium for writing of information is carried out on the predermined position of its surface. In order to precisely guide the laser beam to the predetermined irradiation area (generally referred to as "tracking"), the recording medium such as an optical disc is generally provided on its surface with a tracking guide in the form of concave groove (i.e., pregroove) as illustrated in FIG. 1 of an attached drawings. In FIG. 1, "h" indicates a depth of the groove and "w" indicates a half width of the groove (i.e., a width of the groove at a half-depth position of the groove depth).

The previously known recording media of DRAW type are reproduced on a reproducing apparatus which is specifically designed for the employed recording media.

In view of satisfactory availability of unexpensive CD (compact disc) players, it has been recently proposed to employ such CD players for reproduction of information recorded on recording media of DRAW type. For this reason, a number of studies have been made to give a recording medium of DRAW type in which information can be independently recorded after the preparation of the medium and the recorded information can be reproduced utilizing the commercially available CD players. An information recording medium of such type is generally called a compact disc of DRAW type (CD-DRAW).

The compact discs of DRAW type (CD-DRAW) are disclosed in Japanese Patent Provisional Publications No. 61-237239, No. 61-239443 and No. 63-179425. An optical disc described in the Provisional Publication No. 61-237239 comprises a substrate and a recording layer of a dye provided thereon. An optical disc described in the Provisional Publication No. 61-239443 comprises a substrate and a recording layer of an indolenine dye provided thereon. It is described that signals recorded on these optical discs can be reproduced by means of a commercially available CD player. An optical disc described in the Provisional Publication No. 63-179425 comprises a substrate and a recording layer of a composition of a metal and a metal compound and has a high reflectance. It is described that signals recorded thereon can be reproduced by means of a commercially available CD player. In any of these publications, pregrooves provided on the substrates of the compact discs of DRAW type are stated to have such dimension as a half width of 0.8 μm and a depth of 700 angstroms.

In order to enable information recorded on an optical disc to reproduce therefrom by means of a commercially available CD player, it is required for the optical disc to have a high reflectance (preferably not less than 60%) to a laser beam for reproduction. However, a recording layer comprising a metal or a dye which is excellent in recording characteristics such as recording sensitivity generally gas a reflectance in the range of 30 to 40%, while a recording layer comprising different materials which exhibit high reflectances has disadvantage with respect to of recording or reproducing characteristics. To enhance the reflectance of an optical disc using a dye or a metal as a recording material, it is thought that a reflecting layer be provided on the recording layer. From the viewpoint of preparation of a recording layer, use of a dye is advantageous as compared to that of a metal because a recording layer of the dye can be easily formed by coating of the dye solution. Thus, a compact disc of DRAW Type consisting of a substrate, a dye recording layer, a reflecting layer and a protective layer superposed in order, is described in "NIKKEI ELECTRONICS" (No. 465, p. 107, Jan. 23, 1989). In recording the desired information on the compact disc, the disc surface is irradiated with a laser beam from the substrate side to record information by producing rising deformation (protrusion) on a surface of the substrate on the recording layer side. It is stated that the compact disc having the above mentioned structure shows a high reflectance and when signals of CD format are recorded on the disc, the signals can be reproduced utilizing of a commercially available CD player.

SUMMARY OF THE INVENTION

The present inventors have studied an information recording medium such as a compact disc of DRAW type (CD-DRAW) having a recording layer of a dye provided on a substrate and a reflecting layer provided thereon in which information such as CD formating signals can be recorded at a low linear rate. In the course of their study, the inventors have made experiments to trace the disclosure of the above-mentioned "NIKKEI ELECTRONICS". In their trial, they have note that "NIKKEI ELECTRONICS" gives no description of dimensions of a pregroove on the substrate, though the structure of layers constituting the compact disc is described. Therefore, the present inventors have prepared an optical disc of the above structure using a substrate on which pregroove has dimensions of a half width of 0.8 μm and a depth of 700 angstroms (these dimensions are described in the above mentioned Provisional Publications) and have studied the observed recording characteristics. As a result, it has been revealed that the obtained optical disc is apt to show unsatisfactory tracking characteristics such as frequent occurrence of tracking errors in recording and/or reproducing procedures and to cause read error due to low modulation factor of recorded signals. To solve such problem, the inventors have given attention to the dimensions of the pregroove and have made study from the viewpoint of the groove dimensions which is capable of giving good characteristics in the employment of the structure consisting of a substrate, a dye recording layer and a reflecting layer. As a result of the study, they have discovered requirement of dimensions of the pregroove which are very appropriate for showing excellent tracking characteristics as well as a high modulation factor of recorded signals.

Accordingly, it is an object of the present invention to provide a process for optically recording information by irradiating a groove of a pregroove with a laser beam under accurate tracking to record signals with a high modulation factor.

It is another object of the invention to provide a process for optically recording information by irradiating a groove of a pregroove with a laser beam at a low linear predetermined rate under accurate tracking to record signals with a high modulation factor.

It is another object of the invention to provide a process for optically recording information under accurate tracking by a push-pull tracking method.

It is another object of the invention to provide a process for optically recording digital signals of CD format with a low linear predetermined rate.

It is another object of the invention to provide an information recorded medium by the above recording method.

It is further object of the invention to provide an information recorded medium having a high reflectance in which the recorded signals can be reproduced utilizing a commercially available CD player.

There is provided by the present invention a method of optically recording information on an information recording medium comprising a disc-shaped substrate, a recording layer comprising a dye for optically recording information by means of a laser beam which is provided on the substrate, and a reflecting layer consisting of a metal which is provided on the recording layer, the surface of said substrate being provided with a pregroove having a depth of 800 to 2,000 angstroms and a half width of 0.2 to 0.7 μm, which comprises irradiating a bottom part of the pregroove having the recording layer thereon with a laser beam from a substrate side under rotation of the recording medium.

There is also provided by the invention an information recorded medium comprising a disc-shaped substrate, a recording layer comprising a dye for optically recording information by means of a laser beam which is provided on the substrate, and a reflecting layer consisting of a metal which is provided on the recording layer, the surface of said substrate being provided with a pregroove having a depth of 800 to 2,000 angstroms and a half width of 0.2 to 0.7 μm, which is recorded with information on a bottom part of the pregroove having the recording layer thereon.

The process of the invention for optically recording information by irradiating a bottom part of the pregroove of the optical disc comprising a substrate, a dye-type recording layer and a reflecting layer exhibits excellent tracking characteristics, particularly in the case of using a push-pull tracking method. Signals recorded by the process show a high modulation factor and C/N. Further, the recorded optical disc has a high reflectance.

In more detail, in the case that signals such as degital signals of CD format are recorded in the groove of the optical disc with a low linear rate (i.e., high density recording) under tracking by a push-pull tracking method, enhanced tracking characteristics in the recording procedure and a high modulation factor in recorded signals are obtained by adopting the dimensions of the groove according to the present invention. Further, the optical disc in which CD formating signals are recorded has a high reflectance so that the recorded signals can be reproduced utilizing commercially available compact disc players.

DETAILED DESCRIPTION OF THE INVENTION

Figure 1:
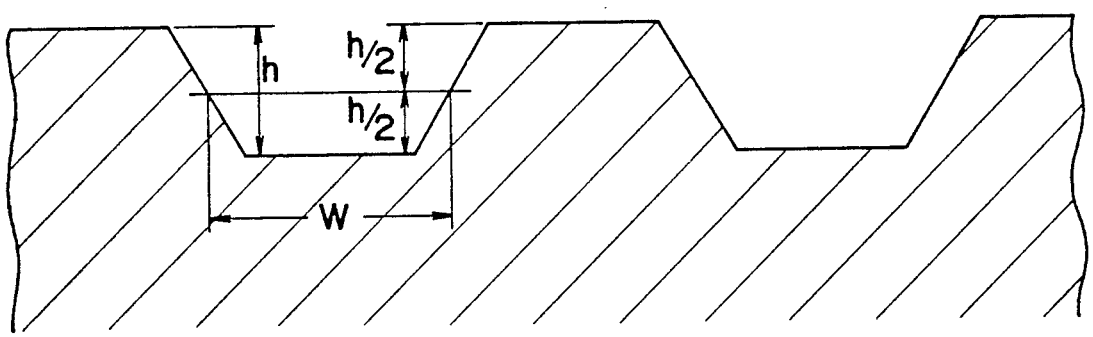
FIG. 1 is a schematic view illustrating a section of a substrate of an information recording medium according to the present invention.

An information recording medium employed in the method of the present invention has a basic structure comprising a substrate having a pregroove thereon, a recording layer containing a dye provided on the pregroove and a reflecting layer provided on the recording layer. In the structure, the recording layer has advantages of easily preparing the layer and a high recording sensitivity, and the reflecting layer does function to enhance reflectance which is generally low in an optical disc having the recording layer of a dye.

The information recording medium can be prepared, for example, by the following process.

A material of the substrate employable in the invention can be selected from any materials which are used for the preparation of the substrate of the conventional recording media. From the viewpoint of optical characteristics, smoothness, workability, handling properties, long-term stability and manufacturing cost, preferred examples of the substrate materials include glass; acrylic resins such as polymethyl methacrylate; vinyl chloride resins such as polyvinyl chloride and vinyl chloride copolymer; epoxy resins; polycarbonate resin; amorphous polyolefins; and polyesters. Particularly preferred are polycarbonate resins, amorphous polyolefins and polymethyl methacrylate.

The surface of the substrate on which a recording layer is to be formed may be provided with an undercoating layer for the purpose of improving smoothness, adhesion to the recording layer and preventing the recording layer from denaturation. Examples of materials of the undercoating layer include polymer materials such as polymethyl methacrylate, acrylic acid/methacrylic acid copolymer, styrene/maleic anhydride copolymer, polyvinyl alcohol, N-methylol/acrylamide copolymer, styrene/styrenesulfonic acid copolymer, styrene/vinyltoluene copolymer, chlorinated polyethylene, chlorosulfonated polyethylene, nitrocellulose, polyvinyl chloride, polyimide, vinyl acetate/vinyl chloride copolymer, ethylene/vinyl acetate copolymer, polyethylene, polypropylene, and polycarbonte; organic materials such as silane coupling agent; inorganic agent such as $SiO_2$ and $Al_2O_3$; and inorganic fluorides such as $MgF_2$.

The undercoating layer can be formed on the substrate by dissolving or dispersing the above-mentioned material in an appropriate solvent to prepare a coating solution and applying the coating solution onto the surface of the substrate by coating method such as spin coating, dip coating or extrusion coating. The thickness of the layer is generally in the range of 50 to 200,000 angstroms, preferably in the range of 100 to 100,000 angstroms.

A substrate according to the present invention is provided with a pregroove, of which shape is a single concave groove or plural grooves in the form of a spiral or circles. Such substrate can be prepared by injection molding using a die having a pattern corresponding to the pregroove and using a plastic material such as polycarbonate resin, polyacrylic resins, vinyl chloride resins, epoxy resins or amorphous polyolefin (preferably employed is polycarbonate, polymethyl methacrylate or amorphous polyolefin). Otherwise, a substrate having a pregroove can be prepared by placing a resin layer having the pregroove on a plain substrate (if desired, through a undercoating layer).

The surface of the substrate (or the undercoating layer) according to the present invention has the pregroove having a depth (h in FIG. 1) of 800 to 2,000 angstroms and a half width (w in FIG. 1) of 0.2 to 0.7 $\mu$m. These demensions are effective for the purpose of performing an accurate tracking in recording or reproducing procedure. The depth is preferred in the range of 800 to 1,800 angstroms, particularly preferred is in the range of 1,000 to 1,500 angstroms. The half width is preferred in the range of 0.4 to 0.7 $\mu$m.

The intermediate layer may be formed on the pregroove of the substrate by a conventional spin coating method.

Examples of the intermediate layers formed on the substrate include an adhesive layer, a thermal-insulating layer, a reflecting layer, and a sensivity increasing layer (gas generating layer). Examples of polymer materials for the preparation of the intermediate layers include polymethyl methacrylate, acrylic acid/methacrylic acid copolymer, styrene/maleic anhydride copolymer, polyvinyl alcohol, N-methylol/acrylamide copolymer, styrene/styrenesulfonic acid copolymer, styrene/vinyltoluene copolymer, chlorinated polyethylene, chlorosulfonated polyethylene, nitrocellulose, polyvinyl chloride, polyimide, vinyl acetate/vinyl chloride copolymer, ethylene/vinyl acetate copolymer, polyethylene, polypropylene, and polycarbonate. Preferred are chlorinated polyethylene and nitrocellulose. The intermediate layer can be formed on the substrate employing a coating solution in which these polymers are dissolved in a solvent.

The thickness (average thickness) of the intermediate layer is determined in consideration of property required for the intermediate layer. The thickness of the layer generally is in the range of 50 to 5,000 angstroms, and preferably 100 to 1,000 angstroms.

A recording layer comprising a dye is formed on the pregroove of the substrate (or the undercoating layer). The dye-type recording layer is a layer comprising substantially a dye only, or a layer comprising a dye dispersed in a binder such as a polymer binder.

The dye employable in the present invention can be selected from those conventionally used as recording materials of information recording media. Examples of the dyes include a cyanine dye, a phthalocyanine dye, a pyrylium dye, a thiopyrylium dye, an azulenium dye, a squarillium dye, a metal complex salt dye such as dyes containing Ni or Cr, a naphthoquinone dye, an anthraquinone dye, an indophenol dye, an indoaniline dye, a triphenylmethane dye, a triallylmethane dye, an aminium dye, a diimmonium dye and a nitroso compound.

Among those dyes, preferred are dyes showing high absorption for a light in the wavelength region of near infrared such as 700 to 900 nm, because a semiconductor laser emitting the near-infrared rays is used in practic as a laser for recording and reproducing information.

Examples of such dyes showing high absorption are as follows.

Cyanine dye:

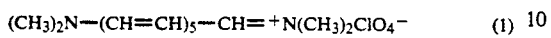

(1)

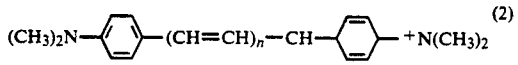

(2)

in which n is 2 or 3.

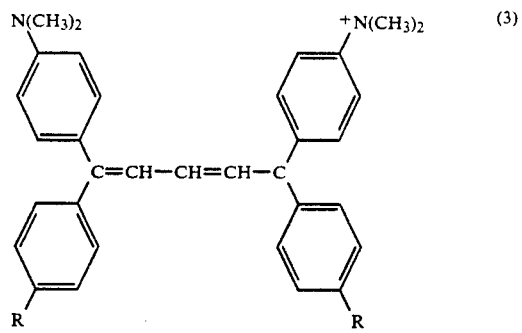

(3)

in which R is hydrogen atom or $N(CH_3)_2$.

$$\Phi^+ - L = \psi(X^{m-})_{1/m} \qquad (4)$$

in which each of $\Phi$ and $\psi$ is a residue of an indolenine ring, a thiazole ring, an oxazole ring, a selenazole ring, an imidazole ring, a pyridine ring, thiazolopyrimidine ring or imidazoquinoxaline ring which may be condensed with an aromatic ring; L is a connecting unit for forming monocarbocyanine, dicarbocyanine, tricarbocyanine or tetracarbocyanine; $X^{m-}$ is a m-valent anion; and m is 1 or 2; $X^{m-}$ may be substituted on $\Phi$, L or $\psi$ to form an innert salt; and $\Phi$ and L or $\psi$ and L may be linked to each other to form a ring.

Concrete compounds having the above formula (4) include the following compounds a) to k).

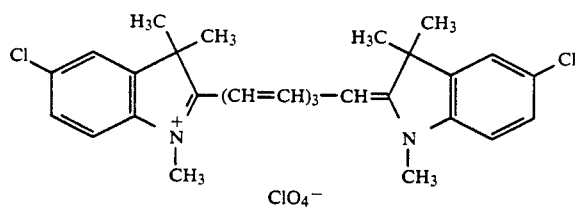

[a]

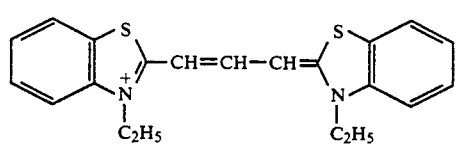

[b]

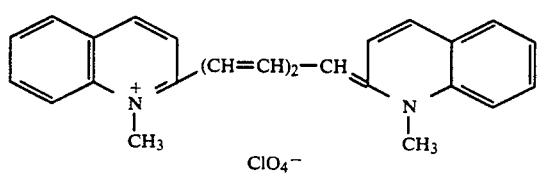

[c]

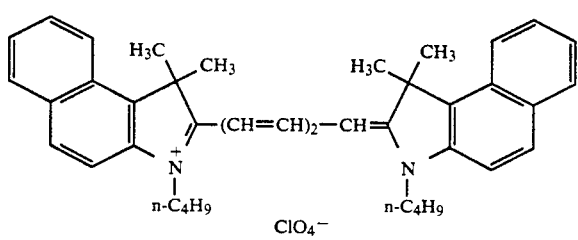

[d]

-continued
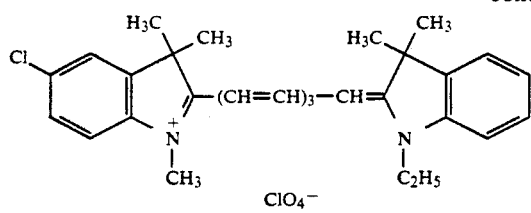 [e]
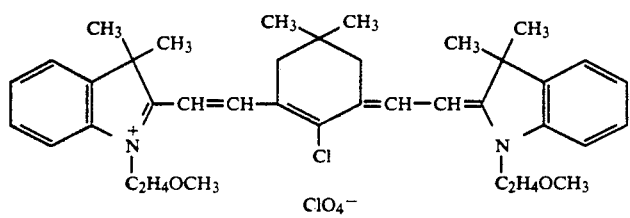 [f]
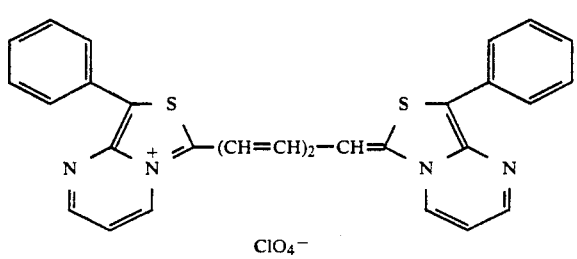 [g]
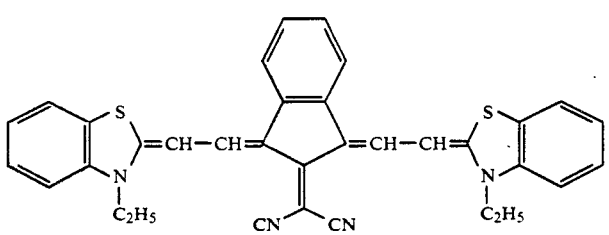 [h]
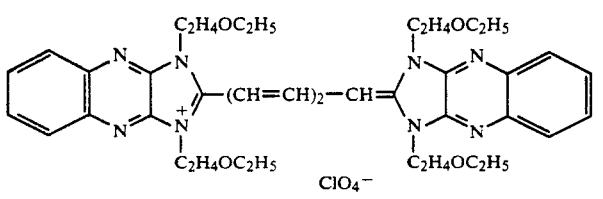 [i]
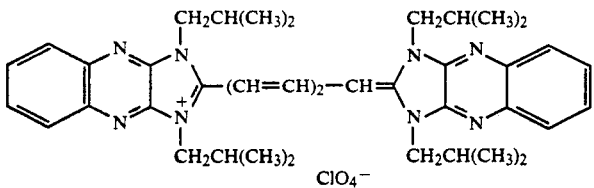 [j]
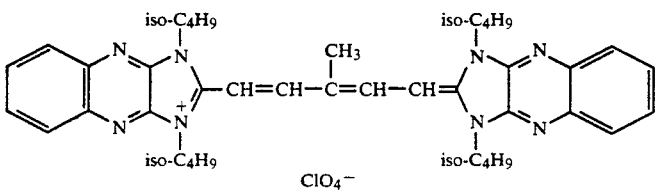 [k]
Squarillium dye:

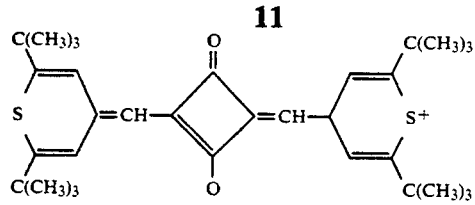

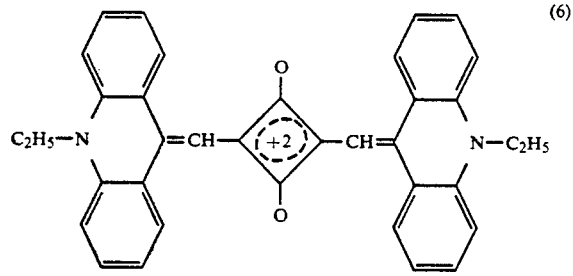

Azulenium dye:

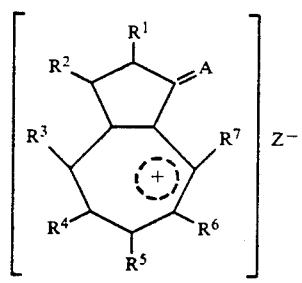

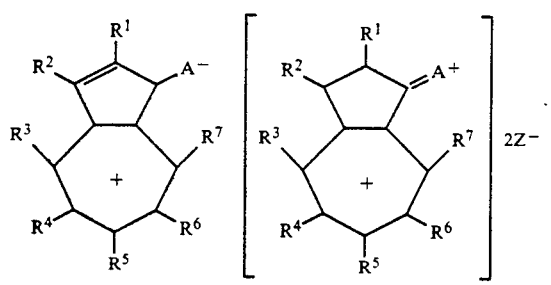

in which at least one combination of $R^1$ and $R^2$, $R^2$ and $R^3$, $R^3$ and $R^4$, $R^4$ and $R^5$, $R^5$ and $R^6$, and $R^6$ and $R^7$ forms a substituted or unsubstituted heterocyclic ring or aliphatic ring, and each of $R^1$, $R^2$, $R^3$, $R^4$, $R^5$, $R^6$ and $R^7$ is hydrogen atom, a halogen atom or a monovalent organic residue when they do not form said ring; at least one combination of $R^1$ and $R^2$, $R^3$ and $R^4$, $R^4$ and $R^5$, $R^5$ and $R^6$, and $R^6$ and $R^7$ may form a substituted or unsubstituted aromatic ring; A is a divalent organic residue bonded through a double bond; and $Z^-$ is an anionic residue. Herein, at least one carbon atom constituting the azulene ring may be substituted with nitrogen atom to form an azazulene ring.

Indophenol dye:

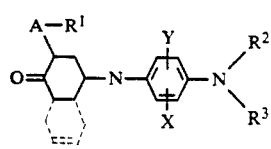

in which each of X and Y is a hydrogen atom, an alkyl group, an acylamino group, an alkoxy group or a halogen atom; each of $R^1$, $R^2$ and $R^3$ is a hydrogen atom, a substituted or unsubstituted alkyl group, an aryl group, a heterocyclic ring or cyclohexyl group having 1-20 carbon atoms; and A is —NHCO— or —CONH—.

Metal complex salt dye:

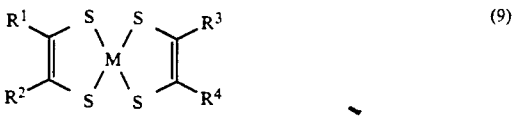

in which each of $R^1$ to $R^4$ is an alkyl group or an aryl group; and M is a divalent transition metal atom.

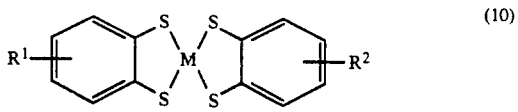

in which each of $R^1$ and $R^2$ is an alkyl group or a halogen atom; M is a divalent transition metal atom.

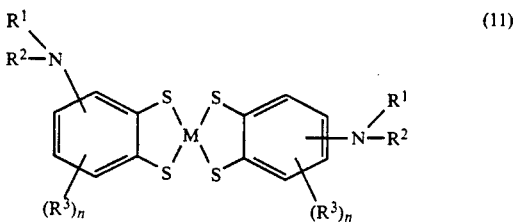

in which each of $R^1$ and $R^2$ is a substituted or unsubstituted alkyl or aryl group; $R^3$ is an alkyl group, a halogen atom or a group of $$-\overset{R^4}{\underset{|}{N}}-R^5$$

(wherein each of $R^4$ and $R^5$ is a substituted or unsubstituted alkyl or aryl group); M is a transition metal atom; and n is an integer of 0-3.

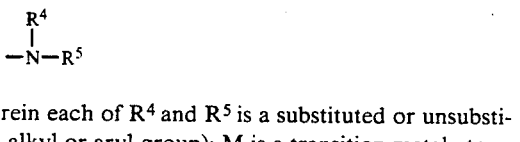

in which [Cat] is a cation required for formation of a neutralized complex salt; M is Ni, Cu, Co, Pd or Pt; and n is 1 or 2.

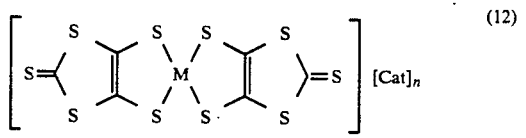

in which [Cat] is a cation required for formation of a neutralized complex salt; M is Ni, Cu, Co, Pd or Pt; and n is 1 or 2.

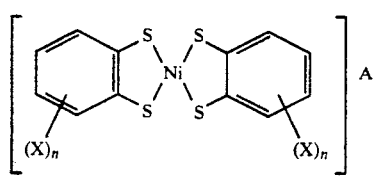
(14)

in which X is a hydrogen atom, chlorine atom, bromine atom or methyl group; n is an integer of 1 to 4; and A is quaternary ammonium group.

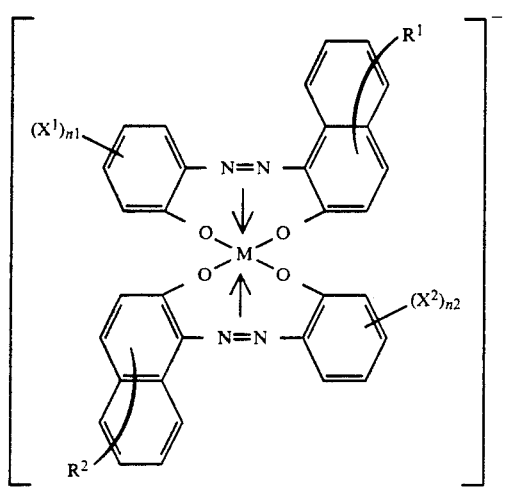
(15)

in which each of $X^1$ and $X^2$ is a nitro group or a halogen atom; each of $n_1$ and $n_2$ is an integer of 1 to 3; each of $R^1$ and $R^2$ is an amino group, a monoalkylamino group, a dialkylamino group, acetylamino group, a benzoylamino group (including a substituted benzoylamino group); $X^1$ and $X^2$ are the same or different from each other; $n_1$ and $n_2$ are the same or different from each other; $R^1$ and $R^2$ are the same or different from each other; M is Cr or Co; and Y is hydrogen, sodium, potassium, ammonium (including substituted aliphatic ammonium) or an aliphatic ammonium.

Naphthoquinone dye, Anthraquinone dye:

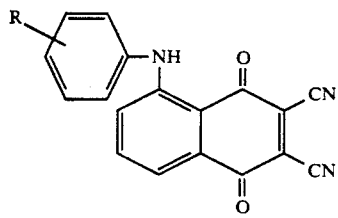
(16)

in which R is a hydrogen atom, an alkyl group, an allyl group, an amino group or a substituted amino group.

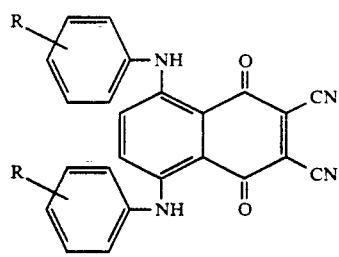
(17)

in which R is a hydrogen atom, an alkyl group, an allyl group, an amino group or a substituted amino group.

(18)

in which R is a hydrogen atom, an alkyl group, an allyl group, an amino group or a substituted amino group.

(19)

in which X is a halogen atom; and n is an integer of 0 to 10.

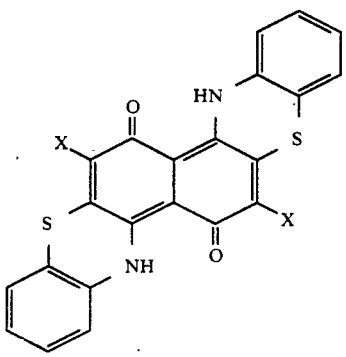
(20)

in which X is a halogen atom.

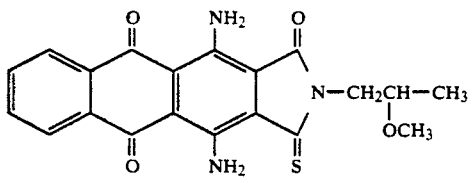 (21)

Among the above-mentioned dyes, cyanine dyes, azulenium dyes and squarillium dyes are most preferably used in the present invention. Among cyanine dyes, benzoindolenine dyes and imidazoquinoxaline dyes are preferable. The above-mentioned dyes can be employed singly or in combination. In the case of using a cyanine dye, the above-described metal complex salt dye, aminium dye or diimmonium dye may be employed as a quencher in combination with the cyanine dye. The additional amount of the quencher such as metal-complex dye is preferred in the range of 0.001 to 0.1 mol to 1 mol of the whole dye.

The formation of the recording layer can be done by dissolving the above-mentioned dye (as well as a binder, if desired) in a solvent to prepare a coating solution, then coating the solution over the surface of the substrate, and drying the coated layer.

In the present invention, the dye-type recording layer is formed on a substrate having a pregroove of specifically defined dimensions thereon. A coating solution for forming the recording layer contains a solvent. Some of solvents employable in the coating solution may dissolve or cause swelling of a substrate. Use of such solvents causes deformation of the pregroove on the substrate, so that the characteristic effect of the present invention can be not obtained. Accordingly, it is required, as a solvent for the coating solution, to employ such one which dissolves a dye but does not dissolve a substrate.

Examples of the solvents employable for the preparation of the coating solution include known solvents such as esters (e.g., ethyl acetate, butyl acetate and cellosolve acetate), ketones (e.g., methyl ethyl ketone, methyl isobutyl ketone, and cyclohexanone), halogenated hydrocarbons (e.g., dichloromethane, 1,2-dichloroethane and chloroform), amides (e.g., dimethylformamide), sulfoxides (e.g., dimethylsulfoxide), ethers, (e.g., tetrahydrofuran, dioxane, and diethyl ether), alcohols (e.g., ethanol, n-propanol, isopropanol and n-butanol) and fluorine-containing compounds (e.g., 2,2,3,3-tetrafluoropropanol). These non-hydrocarbon organic solvents may contain such a hydrocarbon solvent as an aliphatic hydrocarbon solvent, an alicylic hydrocarbon solvent, an aromatic solvent, so long as it is contained in an amount not more than 50% in volume. In the case that polycarbonate, for example, is used as a material of substrate, it is preferable to use such solvents as comprising ethanol, n-propanol, isopropanol, n-buthanol or 2,2,3,3-tetrafluoropropanol alone. The coating solution for the formation of the recording layer may further contain other additives such as an antioxidant, a UV-absorbent, a plasticizer and a lubricant according to the purpose.

Examples of the binder polymers employable for the formation of the recording layer include natural organic polymer materials such as gelatin, cellulose derivative, dextran, rosin and rubber; synthetic organic polymer materials such as hydrocarbon resins (e.g., polyethylene, polypropylene, polystyrene and polyisobutylene), vinyl resins (e.g., polyvinyl chloride, polyvinylidene chloride and vinyl chloride/vinyl acetate copolymer), acrylic resins (e.g., polymethyl acrylate and polymethyl methacrylate), and precondensates of thermosetting resins (e.g., polyvinyl alcohol, chlorinated polyethylene, epoxy resin, butyral resin, rubber derivatives, and phenol formaldehyde resin).

When the binder is used for the formation of the recording layer, the ratio of the dye to the binder is generally in the range of 0.01 to 99 wt. %, preferably 1.0 to 95 wt. %.

The coating procedure can be carried out by a conventional method such as spray coating, spin coating, dip coating, roll coating, blade coating, doctor roll coating or screen printing.

The recording layer may be in the form of a single layer or plural layers, and in any case, the thickness of the recording layer is generally in the range of 200 to 3,000 angstroms. Further, since the recording layer ought to be left in its thickness to some extent after a cavity is formed on the interface between a recordinjg layer and a reflecting layer, its thickness is preferred to be in the range of 500 to 2,000 angstroms.

On the recording layer is provided a reflecting layer. The reflecting layer is essentially composed of a light-reflecting material. The light-reflecting material has a high reflectance for the laser beam. Examples of the light-reflecting materials include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi. These materials can be used alone or in combination. Alloys thereof can be also employed. Among these materials, preferred are Au, Ag, Cu, Pt, Al, Cr, Ni and stainless steel.

The reflecting layer can be formed on the recording layer using the light-reflecting material according to a known method such as deposition, sputtering or ion plating. The thickness of the reflecting layer is generally in the range of 100 to 3,000 angstroms, and preferred is a thickness in the range of 500 to 2,000 angstroms.

A protective layer may be further provided on the reflecting layer to physically or chemically protect the recording layer. The protective layer can be also provided on the surface of the substrate where the recording layer is not provided to enhance a resistance to scratch or humidity. As material of the protective layer, there can be mentioned inorganic materials such as SiO, $SiO_2$, $MgF_2$ and $SnO_2$; and organic materials such as thermoplastic resins, thermosetting resins and UV-curable resins.

The protective layer can be formed on the reflecting layer or the substrate by laminating a plastic film having been prepared by extrusion over the reflecting layer and/or on the substrate by way of an adhesive layer. Otherwise, a method of vacuum deposition, sputtering or coating can be also applied to form the protective layer. In the case of using the thermoplastic resin or the thermosetting resin as material of the protective layer, the resin is dissolved in an appropriate solvent to prepare a coating solution, and the solution is coated over the recording layer and/or the substrate. The coated layer is then dried to form a protective layer. In the case of using the UV-curable resin, a solution of the resin in an appropriate solvent is coated over the reflecting layer and/or the substrate, and the coated layer of the solution is irradiated with ultraviolet rays to cure the layer whereby a protective layer is formed. Examples of such UV-curable resin include oligomers such as urethane acrylate, urethane methacrylate, epoxy acrylate, epoxy methacrylate, polyester acrylate and polyester methacrylate; monomers such as acrylic esters and methacrylic esters and various photo-intiators. In any case, the coating solution may further contain a variety of additives such as an antistatic agent, an antioxidant and a UV-absorbent according to the purpose. In the present invention, the protective layer is preferred to be formed by coating method from the viewpoint of easiness in manufacturing an optical disc. Further, the protective layer is particularly preferred to be form by coating the UV-curable resin.

The thickness of the protective layer is generally in the range of 0.1 to 100 μm.

The structure of the information recording medium employable for the method of the present invention is by no means limited to the above-mentioned structure, and other structures are also emplyable. For example, there are employable an information recording medium in which two substrates having the above-mentioned constitution and interposing the recording layer are combined using an adhesive, or an information recording medium of air-sandwich structure in which two disc-shaped substrates, at least one of those substrates having the above-mentioned constitution, are combined with each other by way of a ring-shaped outer spacer and a ring-shaped inner spacer so as to form a closed space surrounded by the two substrates and the two spacers.

The method of optically recording information according to the present invention is described below. Recording of optical information can be carried out using the above-described recording medium in the following manner.

Recording of information on the information recording medium is performed by irradiating the bottom part of the pregroove having the recording layer thereon with a laser beam from a substrate side under rotation of the recording medium. That is groove-recording. As stated above, a depth (h in FIG. 1) of the pregroove is in the range of 800 to 2,000 angstroms and a half width (w in FIG. 1) is in the range of 0.2 to 0.7 μm. The rotation of the recording medium is preferably made at a predetermined linear rate of 1.2 to 2.8 m/sec., and more preferably at a predetermined linear rate of 1.2 to 1.4 m/sec., because the recording method is advantageous to recording of information at slow linear rate which enables a high density recording. Simiraly, information to be recorded is preferably composed of EFM signals according to CD format appropriate for a high density recording. As the recording light, a semiconductor laser beam having the wavelength region of 750 to 850 nm is generally used. In the information recording medium of the invention, information can be recorded at a recording power of not more than 10 mW. The information recording medium of the invention comprises a disc-shaped substrate, a recording layer consisting of a dye provided on the substrate, and a reflecting layer of a metal provided on the recording layer. The recording of information is generally made on the bottom part of the pregroove by forming change of shape or conditions of the recording layer, change of shapes or conditions of both the recording layer and the reflecting layer, or the like, through irradiation of a laser beam on the bottom part of the pregroove. In the present invention, the recording of information is preferably carried out by forming a cavity (hollow space) on the interface between the dye recording layer and the reflecting layer through irradiation of a laser beam on the groove. In this case, the recording may be made by forming rise of the surface on the recording layer side of the substrate with the formation of a cavity on the interface between the recording layer and the reflecting layer. Further, the recording may be made by forming only rise of the surface on the recording layer side of the substrate.

The above-mentioned method of the invention for optically recording information exhibits excellent tracking characteristics in the recording or reproducing procedure, particularly in the case of utilizing a push-pull tracking method. Signals recorded by the method show a high modulation factor and C/N. Further, the optical disc has a high reflectance, even after an information is recorded thereon. If on the pregroove having the specific dimensions is provided a recording layer consisting of a metal, the above advantages are hardly obtained. As shown in the present invention, only when on the optical disc consisting of a dye-type recording layer provided on the pregroove and a reflecting layer provided on the recording layer is optically recorded information, a high modulation factor and an excellent tracking property, particularly by a push-pull tracking method, can be obtained.

It is not clear why the recording method gives an excellent tracking property by a push-pull tracking method in recording or reproducing procedure and a high modulation factor of the recorded signals. However, based on analysis by the inventors, the following is assumed.

As to a tracking property, when a coating solution for a dye-type recording layer is coated over a pregroove of a substrate, the coating solution coated on a side wall of the groove is apt to flow along the wall to deposit the bottom of the groove. Therefore, the thickness of the recording layer is thicker on the bottom of the groove than the land (area formed between the adjoining grooves). The dimension of the pregroove on the dye recording layer corresponding to the pregroove on the substrate is small in depth compared with that of the substrate. In other words, the reflectance of the interface between the dye-type recording layer and the reflecting layer on the groove is low and the reflectance of the interface between these on the land is relatively high. In the case that no reflecting layer is provided on the recording layer, the amount of light reflected on the optical disc comprises mainly that on the interface between the substrate and the recording layer. In the case of the dye-type recording layer having the reflecting layer thereon, the amount of the reflected light comprises mainly that on the interface between the dye-type recording layer and the reflecting layer. Therefore, the amount of light reflected on the interface between the dye-type recording layer and the reflecting layer is important in the present invention. The deep depth of the groove according to the invention, as a result, becomes such dimension as the above difference of the thicknesses of the dye-type recording layer is taken into consideration. Whereby, the phase difference between the reflected light of the land portion and that of the groove portion on the interface between the dye-type recording layer and the reflecting layer is apt to occur, and the phase difference brings about the difference of the reflectances. Further, decrease in width of the groove according to the invention generally leads to large signals for tracking but the amount of the reflected light reduces. Since the optical disc of the invention has a sufficiently high reflectance, it is no problem that the narrow width reduces the reflectance. Accordingly, the optical disc of the invention is advantageous for tracking by a push-pull tracking method which is conducted by irradiating a groove with a single laser beam to detect the difference of reflectance between right and left portions of the groove.

Figure 2:
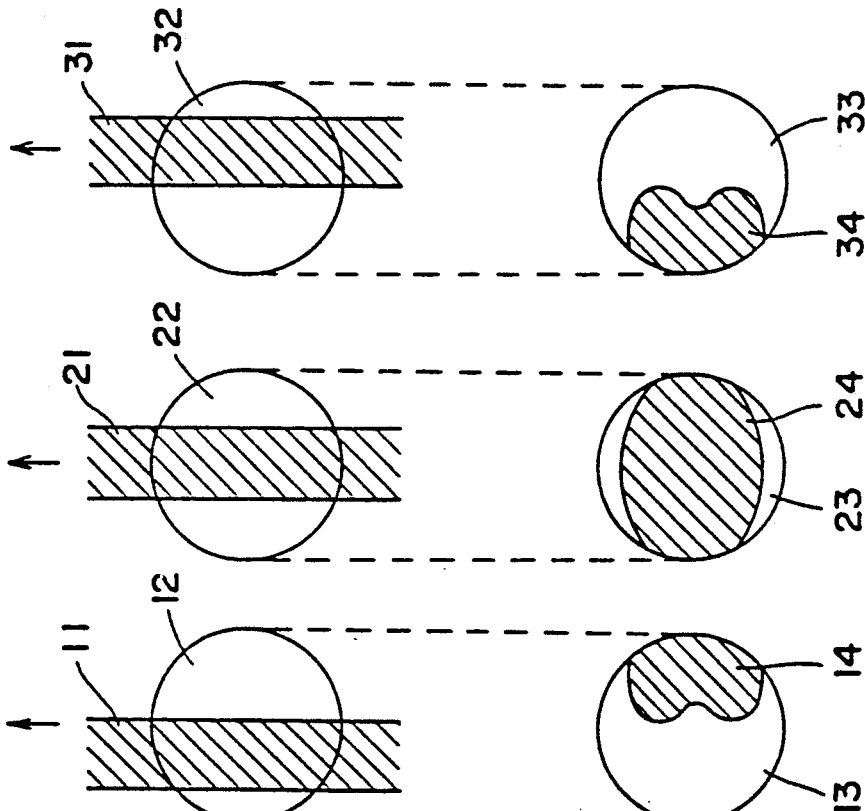
FIGS. 2(a)-2(c) schematic views illustrating shapes of a groove provided on the substrate of the invention, a spot of a single beam located on the groove by a push-pull tracking method and light strength distribution on the surface of a detector formed by reflecting beam on the groove, respectively.

Tracking servo of a push-pull tracking method employed in the invention is conducted by irradiating a groove provided on a substrate with a single laser beam as shown in FIG. 2, the groove having a recording layer thereon. In FIG. 2, each of 11, 21 and 31 indicates a groove provided on a substrate, each of 12, 22 and 32 indicates a spot which is formed on the groove by irradiating the groove with a laser beam, each of 13, 23 and 33 indicates the light portion which is formed on the surface of the detector by the reflection of the beam on the groove, and each of 14, 24 and 34 indicates the dark portion formed on the surface of the detector. The reflecting light on the spot portion is inversely reached left and right on the surface of the detector divided to left and right in a track direction. The distribution of the amount of the reflecting light is shown in shapes composed of the light and dark portions. The tracking servo signals are detected as difference between the amount of light at the left side of the detector plate and that at the right side. FIG. 2 (b) shows tracking condition that a beam spot 22 which the laser beam forms on the recording layer is located at the center of a groove 21. In this case, the amount of light reflected at the right side of the spot is as much as that at the left side of the spot, so that difference between the amount of the light at the left side of the detector plate and that at the right side becomes zero. FIG. 2 (a) shows tracking condition that a beam spot 12 is located at the right side of a groove 11. The amount of light reflected at the right side of the spot is more than that at the left side of the spot, so that the light portion 13 is formed on the left side of the surface of the detector and the dark portion 14 is formed on the right side. Accordingly, difference between the amount of light at the left side of the detector and that of the right side is generated and the difference is detected as signals. FIG. 2 (c) shows tracking condition that a beam spot 32 is located at the left side of a groove 31. The amount of light reflected at the left side of the spot is more than that at the right side of the spot, so that the light portion 33 is formed on the right side of the surface of the detector and the dark portion 34 is formed on the left side. Accordingly, difference between the amount of light at the left side of the detector and that of the right side is detected as a signal which is opposite to FIG. 2 (a) in a sign (+ or −). In such a manner, the push-pull tracking method can be conducted.

Information recorded in the above manner can be reproduced by irradiating the medium with a semiconductor laser beam from the substrate side under rotation at the same linear late as described in the recording procedure and detecting the reflected light. The recording medium of the invention has so high reflectance that the information recorded thereon can be sufficiently read out by means of a commercially available CD player.

In the present invention, the recording of information is preferably made by forming a cavity between the recording layer and the reflecting layer through irradiation of a laser beam on the groove as described above. In this case, the recording may be carried out by forming rise of the surface on the recording layer side of the substrate with the formation of a cavity. Further, the recording may be made by forming only rise of the surface on the recording layer side of the substrate.

The mechanism of the formation of the above cavity can be assumed as follows.

When the optical disc is irradiated on the bottom part of the pregroove having the recording layer comprising a dye with a laser beam, the dye of irradiated portion of the recording layer absorbs energy of the laser beam to increase temperature of the portion. With the increase of temperature, the dye produces a gas, which gathers on the interface between the dye recording layer and the reflecting layer. Since the irradiated portion of the dye-type recoring layer rises in temperature to become melting condition, the produced gas causes the dye-type recording layer to deform owing to its pressure. The deformation enables the formation of the cavity between the dye recording layer and the reflecting layer. The cavity is considered growing larger with increase in the amount of the produced gas. In this case, the reflecting layer receives less deformation than the dye-type recording layer because its material is made of metal. Therefore, the reflecting layer maintains its original shape in the plane direction without its deformation during formation of the cavity. Accordingly, the cavity is formed so as to serve as a flat convex lens consisting of both portions of a flat surface on the reflecting layer side and that of a spherical surface or an ellipsoidal surface on the recording layer side. Further, deformation of rise of a substrate comprises both a dye and a material of the substrate which are melted through irradiation of a laser beam to be mixed, or may comprise almost a solidfied dye.

A maximum length in the thickness direction of the cavity is generally in the range of 2 to 80% of the thickness of the recording layer, and is preferred in the range of 10 to 60%. In the case that the maximum length of the cavity is less than 2% of the thickness of the recording layer, effect by presence of the cavity is sufficiently obtained. In the case of more than 80% of the thickness of the recording layer, the length of the cavity in the plane direction of the recording medium becomes greater with increase of length in the thickness direction to enhance a strain of the cavity (pit), whereby quality of the resulting signal is apt to lower.

The above cavity can be formed, for example, under the following conditions.

An optical disc employed in recording procedure is preferably to have a dye-type recording layer of a greater thickness (not less than 1,000 angstroms) compared to that (approx. 500 angstroms) of a conventional optical disc consisting of a substrate and the dye-type recording layer, and a reflecting layer of a greater thickness compared to that (not more than 1,000 angstroms) of a conventional reflecting layer such as one which is formed on a metal-type recording layer. The greater thickness of the dye-type recording layer enables the sufficiently large cavity showing excellent reproduction characteristics such as a high modulation factor to form. The above thickness of the reflecting layer gives depressing a rise of the reflecting layer to reduce deformation of resulting signals. Further, in the case of the provision of a hard-type protective layer on the reflecting layer, the effect of depressing for the cavity to spread in the radial direcrion of the optical disc may be obtained in addition to the depression of the rise of the reflecting layer.

It is not sufficiently clear why the formation of the cavity and rise of the substrate enhances modulation factor. However, based on analysis by the inventors, the following is assumed. It is described with reference to FIG. 3 of the attached drawings.

Figure 3:
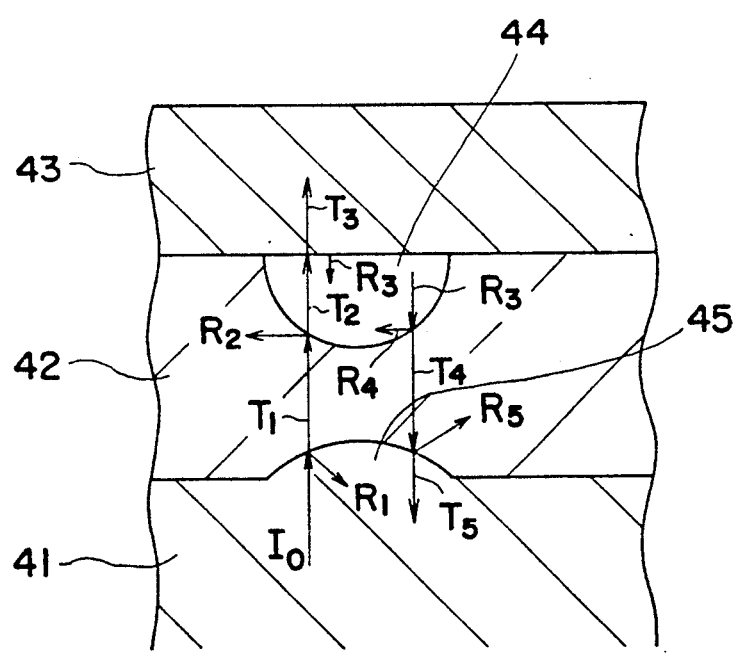
FIG. 3 is a schematic view illustrating a course of a laser beam which is incident on the information recorded medium of the present invention from the substrate side.

In FIG. 3, an information recording medium comprising a substrate 41, a dye-type recording layer 42 and a reflecting layer 43, in which recording of information is conducted by forming a cavity 44 and deformation 45 of the substrate, and a route of a laser beam which is incident on the above information recorded medium from the substrate side are shown.

An incident beam $I_0$ of a laser beam for reproduction of information which is incident on a substrate 41 is divided into a transmitted beam $T_1$ and a reflected beam $R_1$ on the interface between the portion of the deformation 45 and the recording layer 42 due to a difference between the refractive index of the substrate and that of the recording layer. Because a cross section of the interface is in the form of an arc, the reflected beam $R_1$ is irregularly reflected on the interface not to return to a detector of a light head which generates a laser beam. Before recording, the reflected beam $R_1$ almost returns to the detector, because the route of the laser beam is nearly perpendicular to the surface of the substrate. The transmitted beam $T_1$ subsequently is divided into a transmitted beam $T_2$ and a reflected beam $R_2$ on the interface between the recording layer 42 and the cavity 44 due to a difference between the refractive index of the recording layer and that of the cavity (i.e., gas). The difference of the refractive indexes in this case is a large value, so that the amount of light of a reflected beam $R_2$ becomes relatively a large amount. Because a cross section of the interface is also in the form of an arc, the reflected beam $R_2$ is irregularly reflected on the interface not to return to the detector. Further, a transmitted beam $T_2$ is divided into a transmitted beam $T_3$ and a reflected beam $R_3$ on the interface between the cavity 44 and the reflecting layer 43. The reflected beam $R_3$ almost returns to the detector because the course of the laser beam is nearly perpendicular to the surface of the reflecting layer.

Similarly, the reflected beam $R_3$ reflected on the reflecting layer 43 (the course of the beam is moved for convenience to the right side of the drawing) is divided into a transmitted beam $T_4$ and a reflected beam $R_4$ on the interface between the cavity 44 and the recording layer 42 and the reflected beam $R_4$ does not return to the detector. Further, the transmitted beam $T_4$ is divided into a transmitted beam $T_5$ and a reflected beam $R_5$ on the interface between the recording layer 42 and the deformation 45 and the reflected beam $R_5$ does not return to the detector. The final amount of light of the reflected beam on the recorded portion of a signal is equal to the amount of light of the transmitted beam $T_5$. On the other hand, the final amount of light of the reflected beam on the portion on which a signal is not recorded becomes a total of the amount of light of the reflected beam $R_1$, $R_2$, $R_3$, $R_4$ and the transmitted beam $T_5$. Accordingly, a total of the amount of light of the reflected beam $R_1$, $R_2$, $R_3$ and $R_4$, which is a difference between the amount of light on the recorded portion and that on the other portion, is considered to contribute enhancement of modulation factor. Further, in order to obtain a high modulation factor, it is appearent that the cross section of the cavity and the deformation portion of the substrate is preferred to be nearly in the form of an arc.

The optical disc in which signals are recorded in above manner exhibits a sufficiently high modulation factor with keeping a high reflectance.

Examples of the invention and a comparison example are given below, but these examples by no means restrict the invention.

EXAMPLE 1

Aforementioned dye [4]-[d]

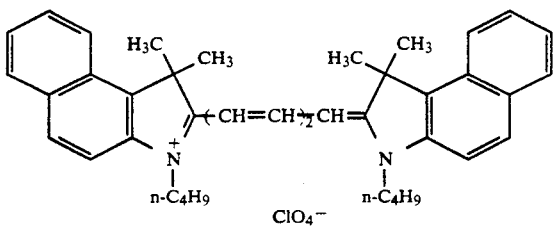

A coating solution for formation of a recording layer was prepared by dissolving 3 g of a dye mixture consisting of the above dye [4]-[d] and a dye having the following formula in molar ratio of 1 to 0.01, in 2,2,3,3-tetrafluoropropanol so as to give a coating solution of concentration of 3 wt. %.

Dye

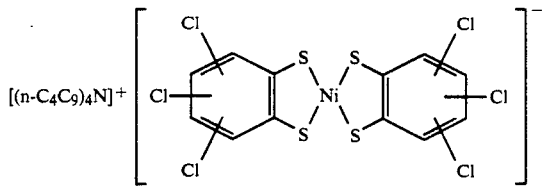

The coating solution containing the dye was coated on a disc-shaped polycarbonate substrate having a pregroove (outer diameter: 130 mm, inner diameter: 15 mm, thickness: 1.2 mm, track pitch: 1.6 μm, half width of groove: 0.63 μm, depth of groove: 1,380 angstroms) by means of spin coating at 1,000 rpm to give a coated layer of the solution, and the coated layer was dried at 1,500 rpm for 1 minute to form a recording layer having dry thickness of 1,300 angstroms.

Over the recording layer was spputered Au to form a reflecting layer of a thickness of 1,300 angstroms.

Further, over the reflecting layer was coated an ultraviolet curable resin (SD17 available from Dainippon Ink & Chemicals Inc.) by means of spin coating at 850 rpm and the coated layer was cured by irradiating with ultraviolet rays from a high-pressure marcury lamp to form a protective layer of a thickness of 1 μm.

Thus, an information recording medium consisting of a substrate, a recording layer, a reflecting layer and a protective layer, superposed in order, was prepared.

EXAMPLE 2

The procedure of Example 1 was repeated except for changing 0.63 μm of a half width of a groove to 0.48 μm and 1,380 angstroms of a depth of a groove to 1,100 angstroms, to prepare an information recording medium.

EXAMPLE 3

The procedure of Example 1 was repeated except for changing 0.63 μm of a half width of a groove to 0.53 μm and 1,380 angstroms of a depth of a groove to 900 angstroms, to prepare an information recording medium.

EXAMPLE 4

The procedure of Example 1 was repeated except for changing 0.63 μm of a half width of a groove to 0.49 μm and 1,380 angstroms of a depth of a groove to 1,600 angstroms, to prepare an information recording medium.

COMPARISON EXAMPLE 1

The procedure of Example 1 was repeated except for changing 0.63 μm of a half width of a groove to 0.80 μm and 1,380 angstroms of a depth of a groove to 700 angstroms, to prepare an information recording medium.

COMPARISON EXAMPLE 2

The procedure of Example 1 was repeated except for changing 0.63 μm of a half width of a groove to 0.40 μm and 1,380 angstroms of a depth of a groove to 700 angstroms, to prepare an information recording medium.

COMPARISON EXAMPLE 3

The procedure of Example 1 was repeated except for changing 0.63 μm of a half width of a groove to 0.88 μm and 1,380 angstroms of a depth of a groove to 1,110 angstroms, to prepare an information recording medium.

COMPARISON EXAMPLE 4

The procedure of Example 1 was repeated except for changing 0.63 μm of a half width of a groove to 0.90 μm and 1,380 angstroms of a depth of a groove to 1,420 angstroms, to prepare an information recording medium.

EVALUATION OF INFORMATION RECORDING MEDIUM

On a bottom part of the pregroove of each of the obtained information recording media were recorded EFM signals according to CD format using a disc evaluation device (Numerical Aperture: 0.5, Semiconductor laser: wavelength of 780 nm) and EFM encoder (available from KEN-WOOD) under recording power of 7 mW at fixed linear rate of 1.3 m/sec.

(1) PP (Push-pull before and after recording (writing))

The recording medium before or after recording of the signals was irradiated with a laser beam having a reproduction power of 0.2 mW at fixed linear rate of 1.3 m/sec. The reflecting light which was reflected on the medium was received a two divided photodiode to detect two signals, and the push-pull was determined as the value that was messured by offsetting the difference between the received two signals by 0.1 μm of a center of a groove.

(2) Modulation factor of signals (3 T and 11 T)

In direct reproduction signals of recording lengthes 11 T and 3 T among signals of CD format as recorded above, the strength of the signal was measured in area having signals and in a mirror area (having no signals) and a modulation factor was determined using the following formula.

$$C = \frac{SH - SL}{SM} \times 100$$

SH: Maximum strength of signals
SL: Minimum strength of signals
SM: Strength of signals in mirror area.

(3) Deformation (11 T)

In reproduced signals of pits having recording lengthes 11 T among signals of CD format as recorded above, maximum and minimum voltages of reproduction signal for one of the pits were measured by means of an oscilloscope and a deformation (D) was determined using the following formula.

$$D = \frac{VA - VI}{VA} \times 100$$

VA: Maximum of voltage of reproduction signal
SL: Minimum of voltage of reproduction signal.

Further, shapes of pits formed in the information reconding media (examples 1 to 4) in which information was recorded in above manner were observed. The protective layer was first peeled from each of the information reconding media and the reflecting layer of the peeled medium was observed under a sccaning tunneling microscope (STM). Subsequently, the reflecting layer was peeled from the medium and the recording layer was observed under the sccaning tunneling microscope. Moreover, the recording layer was peeled from the medium and substrate was observed under the microscope. As a result, no change such as deformation was observed on all the reflecting layers and concave (depression) was observed on each of the all recording layers. The depth of the concave in the thickness direction was approx. 200 angstroms in each of the recording media of Examples 1–4.

The results of measurments ((1)–(3)) are set forth in Table 1.

TABLE 1

|  | Width/depth (μm/ angstroms) | PP Before/after recording | Modulation 3T (%) | Modulation 11T (%) | Deformation (%) |
| --- | --- | --- | --- | --- | --- |
| Ex. 1 | 0.63/1,380 | 2.8/2.3 | 52 | 67 | 10 |
| Ex. 2 | 0.48/1,100 | 2.4/2.2 | 55 | 67 | 12 |
| Ex. 3 | 0.53/900 | 2.0/2.1 | 52 | 62 | 12 |
| Ex. 4 | 0.49/1,600 | 2.9/2.4 | 54 | 69 | 9 |
| Com. 1 | 0.80/700 | 1.3/2.0 | 41 | 48 | 18 |
| Com. 2 | 0.40/700 | 1.2/1.6 | 48 | 57 | 13 |
| Com. 3 | 0.88/1,110 | 2.2/2.5 | 45 | 49 | 16 |
| Com. 4 | 0.90/1,420 | 2.8/2.1 | 44 | 51 | 16 |

As is evident from Table 1, the recording medium having the specific shape of a groove prepared in each of Examples 1 to 4 is excellent in tracking property by a push-pull tracking method and in modulation factor. On the other hand, the recording media with short depth of Comparison Examples 1 and 2 are unsatisfactory in the tracking property. In other word, PP which is signal indicating tracking errors is low. Further, the modulation factor is also unsatisfactory. Particularly, the recording medium with short depth and relatively wide width of Comparison Example 1 shows unsatisfactory value in both modulation factor and defformation. The recording media with wide width of Comparison Examples 3 to 4 are unsatisfactory because of low modulation factor and high deformation.

EFM signals recorded on the recording media of examples 1 to 4 could be reproduced by means of a commercially available CD player. Therefore, these recording media are considered to have reflectance not less than 70%.

We claim:

1. A method of optically recording information on an information recording medium comprising a disc-shaped substrate, a recording layer comprising a dye for optically recording information by means of laser beam which is provided on the substrate, and a reflecting layer of a metal which is provided on the recording layer, the surface of said substrate being provided with a pregroove having a depth of 800 to 2,000 angstroms and a half width of 0.2 to 0.7 μm, which comprises irradiating a bottom part of the pregroove having the recording layer thereon with a laser beam from a substrate side under rotation of the recording medium.

2. The method as claimed in claim 1, wherein said pregroove has a depth of 800 to 1,800 angstroms.

3. The method as claimed in claim 1, wherein said pregroove has a depth of 1,000 to 1,500 angstroms.

4. The method as claimed in claim 1, wherein said pregroove has a half width of 0.4 to 0.7 μm.

5. The method as claimed in claim 1, wherein said rotation is made at a predetermined rate of 1.2 to 2.8 m/sec.

6. The method as claimed in claim 1, wherein said rotation is made at a predetermined rate of 1.2 to 1.4 m/sec.

7. The method as claimed in claim 1, wherein said information to be recorded is composed of EFM signals according to CD format.

8. The method as claimed in claim 1, wherein said information is recorded by forming a cavity between the recording layer and the reflecting layer through the irradiation of a laser beam on the pregroove.

9. The method as claimed in claim 1, wherein said information is recorded by forming a cavity between the recording layer and the reflecting layer and rise of the surface on the recording layer side of the substrate through the irradiation of a laser beam on the pregroove.

10. An information recorded medium comprising a disc-shaped substrate, a recording layer comprising a dye for optically recording information by means of a laser beam which is provided on the substrate, and a reflecting layer of metal which is provided on the recording layer, the surface of said substrate being provided with a pregroove having a depth of 800 to 2,000 angstroms and a half width of 0.2 to 0.7 μm, which is recorded with information on a bottom part of the pregroove having the recording layer thereon.

11. The information recorded medium as claimed in claim 10, wherein said pregroove has a depth of 800 to 1,800 angstroms.

12. The information recorded medium as claimed in claim 10, wherein said pregroove has a depth of 1,000 to 1,500 angstroms.

13. The information recorded medium as claimed in claim 10, wherein said pregroove has a half width of 0.4 to 0.7 μm.

14. The information recorded medium as claimed in claim 10, wherein the recorded infromation is composed of EFM signals according to CD format.

15. The information recorded medium as claimed in claim 1, wherein the recorded information is composed of a cavity between the recording layer and the reflecting layer and cavity formed between the recording layer and the reflecting layer.

16. The information recorded medium as claimed in claim 15, wherein the recorded information is composed of a rise of the surface on the recording layer side of the substrate.

17. The information recorded medium as claimed in claim 10, wherein said dye is at least one dye selected from the group consisting of a cyanine dye, a squarillium dye, an azulenium dye, an imidazoquinoxaline dye and a phthalocyanine dye.

18. The information recorded medium as claimed in claim 10, wherein said substrate is made of a polymer compound selected from the group consisting of polycarbonate, polymethyl methacrylate and amorphous polyolefin.

19. The information recorded medium as claimed in claim 10, wherein said metal is a metal selected from the group consisting of Au, Ag, Cu, Ni, Pt, Cr, Ti and Al.

20. The information recorded medium as claimed in claim 10, wherein on said reflecting layer is provided a protective layer.

* * * * *